May 10, 1927. 1,627,903
A. C. HOUGLAND ET AL
AUTOMATIC CONTROL MECHANISM FOR WATER SOFTENERS
Filed Sept. 22, 1926 2 Sheets-Sheet 1
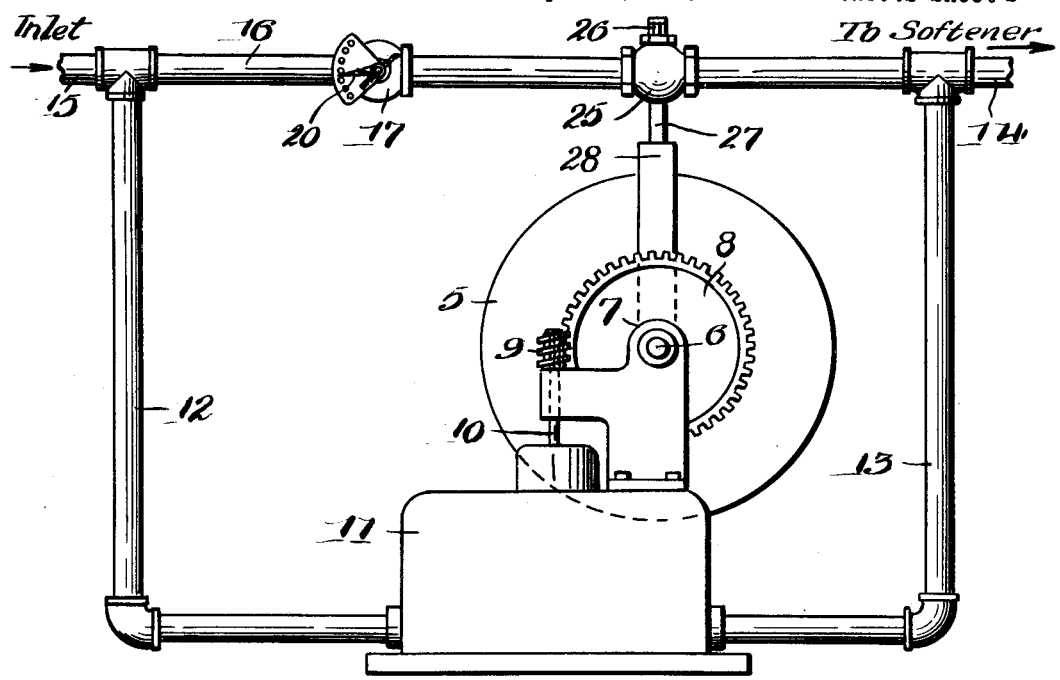
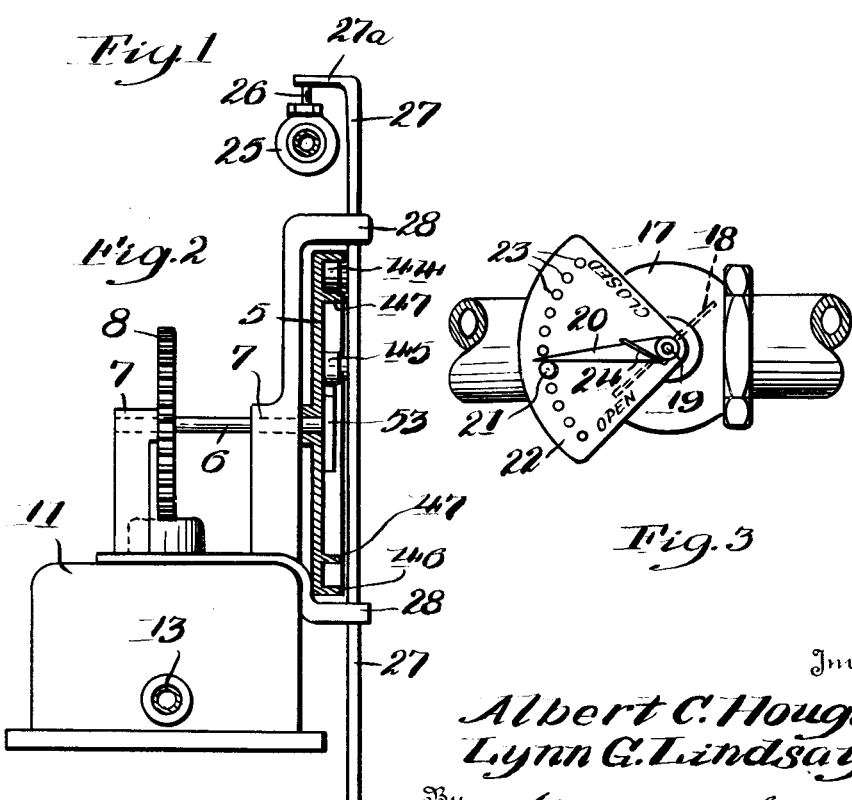
Inventors
Albert C. Hougland
Lynn G. Lindsay
By Stryker & Stryker
Attorneys

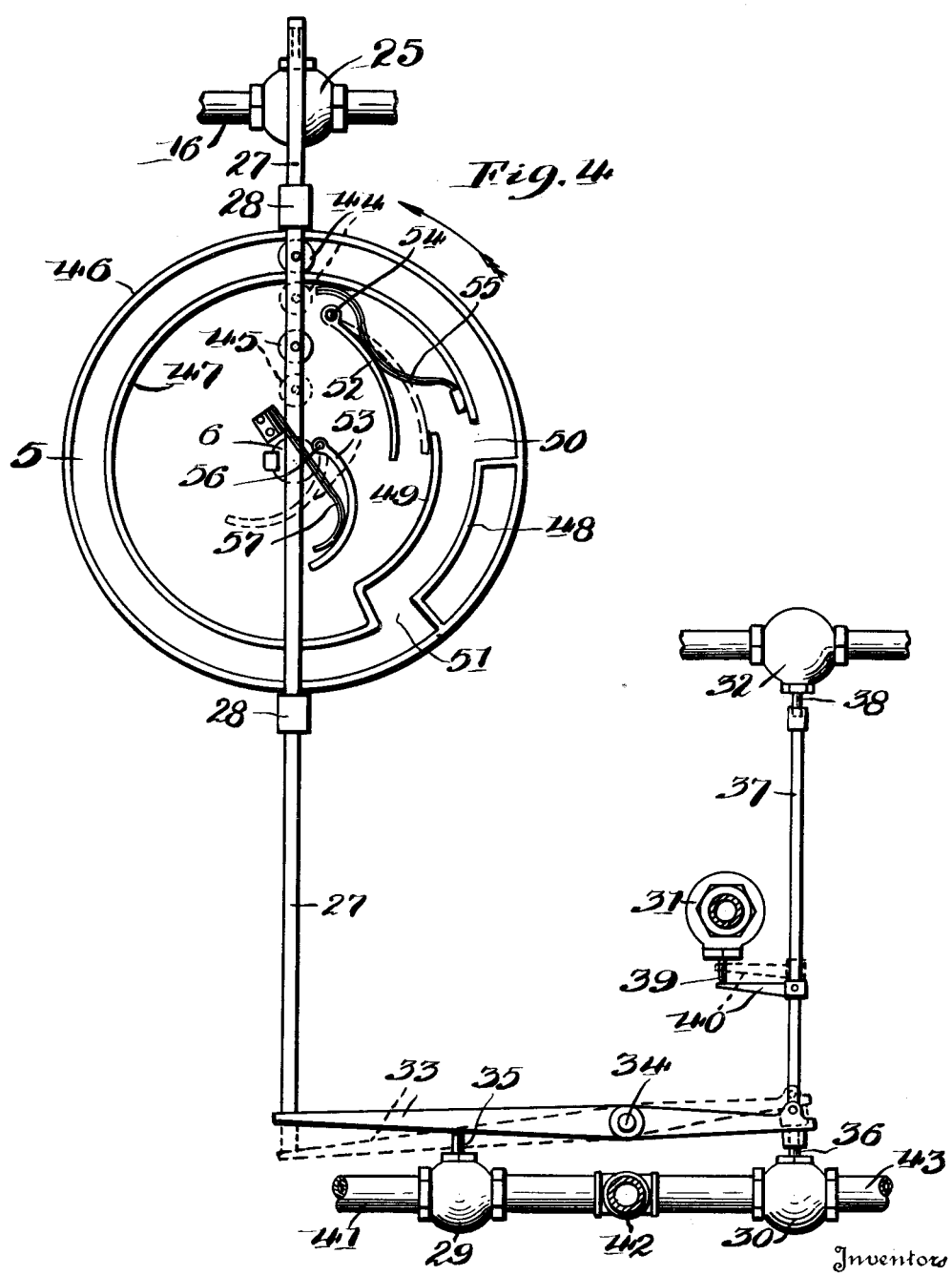

Patented May 10, 1927.

1,627,903

UNITED STATES PATENT OFFICE.

ALBERT C. HOUGLAND, OF ST. PAUL, AND LYNN G. LINDSAY, OF MINNEAPOLIS, MINNESOTA.

AUTOMATIC CONTROL MECHANISM FOR WATER SOFTENERS.

Application filed September 22, 1926. Serial No. 136,943.

This invention relates to automatic control mechanism, particularly, although not exclusively adapted for use with water softening apparatus of the type in which the water to be softened is passed through a granular bed of zeolitic water softening material.

As is well known, the zeolites in such water softeners must be periodically regenerated or revivified by subjecting them to the action of brine. It is necessary to discontinue the passage of hard water through the bed of zeolite and to apply brine thereto for a predetermined period of time and then to remove the brine and admit hard water for the remainder of cycle of operation. With a given softener, the frequency of the regenerating operations is dependent to a large extent upon the hardness of the water. Thus, an automatic control must be adjustable to compensate for water of different hardnesses.

It is the object of this invention to provide unusually simple and efficient means for operating valve mechanism at predetermined intervals under control of a motor which, in turn, is operated by flow of water to the softener.

A further object of this invention is to provide an automatic control which may be adapted by a simple adjustment of a valve to operate with water of different hardnesses. This invention also includes certain novel features of construction, which will be more fully pointed out in the following specification and claims.

The invention will be best understood by reference to the accompanying drawings in which Fig. 1 is a rear elevation of our automatic control; Fig. 2 is a side elevation as viewed from the right of Fig. 1 and showing the cam disc in central, vertical section; Fig. 3 is an enlarged detail of the butterfly valve for controlling the flow of water through a by-pass and Fig. 4 is a front elevation of the cam disc and mechanism for connecting the same with the valves controlling the flow of hard water and regenerating fluid to the softener and outlet of soft water.

As shown in the drawings, we provide a cam disc 5, which is mounted on an end of a horizontal shaft 6. This shaft is journalled in bearings 7 and is arranged to be driven by a worm wheel 8 fixed thereon. To turn the wheel 8, a worm 9 in mesh therewith is mounted upon a vertical drive shaft 10 of a motor 11. A water meter of common type is preferably utilized as the motor 11, because of the small difference between the inlet and outlet pressures required in operation and also because of the convenient speed reducing gears which are provided in such meters for driving the shaft 10.

Water is admitted to the motor 11 through a pipe 12 and a pipe 13 connects the outlet opening of the motor with a pipe 14 leading to the water softener. Flow of water through the motor causes the shaft 10 to be rotated at a rate which is proportional to the quantity of water passing. A hard water supply pipe 15 communicates with the pipe 12 and also with a bypass 16 for the motor which connects with the pipe 14 leading to the softener. A butterfly valve 17 is placed in the by-pass 16 to restrict the opening therethrough. The usual vanes 18 in the valve 17 obstruct the passage to a greater or less extent, dependent upon their position. As best shown in Fig. 3, the vanes are mounted on a pivot pin 19, carrying on the exterior of the valve a finger 20, adapted to engage a stop pin 21 on a quadrant 22. The stop pin 21 may be placed in any one of a series of holes 23 to limit the opening of the valve, a spring 24 being provided to urge the valve toward open position and to hold the finger 20 against the pin 21.

A second valve 25, located in the by-pass 26, is arranged to be normally held open by a suitable spring located within the valve. To operate the stem 26 of the valve 25, we provide a vertically slidable rod 27, having a laterally projecting finger 27ª, engaging the stem 26. This rod 27 is slidable vertically in bearings 28, connected by suitable arms to the bearings 7 and projecting at diametrically opposite peripheries of the disc 5. The rod 27 is also connected with valve mechanism for controlling the admission of water and regenerating fluid to the water softener. One suitable arrangement of connecting mechanism is shown in Fig. 4. As here shown, the opening and closing of valves 29, 30, 31 and 32 is effected by reciprocating movement of the rod 27. The lower end of the rod 27 is pivotally connected to a lever 33, having a pivotal support 34. The operating stem 35 of the valve 29 bears against the bottom of the lever 33 at one side of the pivotal support 34 and the stem 36 of the valve 30 is engaged by the lever 33 at the opposite side of the pivotal support. An upwardly extending rod 37 is also connected to the lever 33, being arranged to actuate the stem 38 of the valve 32 at its upper end. To operate the stem 39 of the valve 31, a finger 40 is mounted on the rod 37 so as to project laterally into engagement with said stem. The valves 29, 30, 31 and 32 are preferably of the "whistle" type in which an internal spring is provided to normally hold the valve in closed position. Thus, when the rod 27 is elevated to the position shown in full lines in Fig. 4, the valves 29, 31 and 32 will be closed and the valves 25 and 30 opened and when the rod 27 is moved downward to bring the lever 33 to its dotted line position, the valves 29, 31 and 32 will be opened and the valves 25 and 30 will be closed. With this arrangement, the valve 29 may represent a control for a drain pipe 41 leading to a pipe 42, connected to the base of the softener and the valve 30 may control the flow of hard water into the base of the softener from an inlet pipe 43. The valve 31 may be employed to control the flow of hard water to the service line and the valve 32 to control the flow of brine into the softener. Other arrangements of valves may be employed within the scope of our invention and we do not wish to limit ourselves to any particular arrangement of valve mechanism. The arrangement of the valves here shown is suitable for use in the water softener described and claimed in the application of Lynn G. Lindsay, filed June 6, 1925, Serial No. 35374.

Upon the side of the rod 27 adjacent to the cam disc 5, we mount rollers 44 and 45. The roller 44 is adapted to run in an annular guide, formed by concentric segments or flanges 46, 47, 48 and 49, on the face of the plate 5. An opening 50 at one end of the guide 47 permits the roller 44 to move radially inward into engagement with the flange 49, and a second opening 51 at the opposite end of the flange 47 permits said roller to return in a radial direction into engagement with the outer flange 46 or between the flanges 46 and 47. The roller 45 is provided to engage mechanism adapted to impart reciprocating movement to the rod 27. The reciprocating mechanism comprises spring pressed fingers 52 and 53 arranged to move the rod under guidance of the segmental flanges in contact with the roller 44. The finger 52 is pivotally mounted upon a pin 54 fixed on the disc 5 and is normally extended by a spring 55 in position to be actuated by the roller 45. The finger 53 is pivotally mounted upon a pin 56 and is normally held so as to project for engagement with the roller 45 by a spring 57.

*Operation.*

In operation, all of the water admitted to the softener is passed from the pipe 15 to the pipe 14. In normal operation, when soft water is being withdrawn, the valve 25 is open and the butterfly valve 17 permits a part of the water to be softened, to flow through the by-pass 16 and not through the motor 11. It will be evident that where very hard water is to be softened, more frequent regeneration of the zeolites is necessary than with water containing a small proportion of hardening salts, and to effect such frequent regeneration, the valve 17 is set so that the by-pass is closed or nearly closed. This setting can be effected by merely placing the stop pin 21 in one of the perforations where the finger 20 will hold the vanes 18 in substantially closed position. With such a setting, substantially all of the water to be softened will pass through the motor 11 with the result that the rate of turning of the cam disc 5 will be increased as compared with a setting of the valve 17 for water containing a smaller proportion of the hardening salts. Whatever the setting of the valve 17, the speed of the cam disc 5 will be proportional to the quantity of water passed through the motor 11.

When water is drawn from the pipe 14 leading to the softener, the disc 5 will be rotated in the direction indicated by an arrow in Fig. 4. Assuming the position of the parts to be as shown in full lines in Fig. 4, rotation of the disc 5 will first bring the finger 52 into engagement with the upper periphery of the roller 45, and as rotation continues, the spring 55 will be compressed until the finger 52 reaches substantially its dotted line position shown in Fig. 4. The compressed spring 55 causes the finger 52 to press the rod 27 downward, and as soon as the roller 44 reaches the opening 50 in the flange 47, the rod 27 will be thrust quickly downward, the roller 44 passing radially toward the axis of the disc. This results in a sudden downward thrust on the rod 27 with consequent opening of the valves 29, 31 and 32 and closing of the valves 25 and 30. Regeneration of the zeolites now continues during the succeeding portion of the cycle of operation, viz., while the roller 44 passes between the guide flanges 48 and 49. During the regenerating portion of the cycle, the finger 53 first strikes the lower periphery of the roller 45 and said roller actuates the finger 53 to compress the spring 57. The rod 27 is thus urged upward, but is held in its depressed position by the flange 48 until the opening 51 is above the roller 44, when the spring 57 thrusts the rod 27 radially upward to its original position.

During the period when the rod 27 is depressed, the valve 25 is closed so that all of the water flowing to the softener must pass through the motor 11. This increases the speed of the disc 5 during the period of regeneration and gives the effect of shorter guide segments 48 and 49. By providing segments 48 and 49 of substantial length, we adapt the cam disc for use with the finger 53, which is engaged by the roller 45 to compress the spring during the regenerating operation. Continued rotation of the disc 5 after the roller 44 has passed through the openings 51 merely causes the roller 44 to rotate between the circular guides 46 and 47. The roller 44 is thus held in position to retain the valve mechanism in normal or operating position until the zeolites again require regeneration.

By our peculiar arrangement of guide segments on the disc 5 and the spring pressed fingers for reciprocating the rod 27, we insure rapid opening and closing of the valves, notwithstanding the very slow movement of the disc about its axis. It will be evident that the by-pass 16 with its controlling valve affords means for adjusting the system to compensate for water of different hardnesses and also for taking care of other changes, such as loss of capacity in the water softening material or zeolite.

Having described our invention what we claim as new and desire to protect by Letters Patent is:

1. In an automatic control for a water softener having valve mechanism for controlling the flow of water and regenerating fluid therethrough, the combination with a water driven motor, of means for supplying water to said softener through said motor, means operated by said motor for periodically actuating said valve mechanism, a by-pass for said motor arranged to supply water to said softener and adjustable means disposed in said by-pass to restrict the flow of water therethrough.

2. In an automatic control for a zeolitic water softener having valve mechanism for controlling the flow of water and regenerating fluid therethrough, the combination with a water driven motor, of means for supplying water to said softener through said motor, a cam operated by said motor and adapted to periodically actuate said valve mechanism to effect regeneration of the zeolitic material, a by-pass for said motor arranged to supply water to said softener and adjustable means disposed in said by-pass to restrict the flow of water therethrough and thereby permit regulation of the speed of said cam according to the hardness of the water to be softened.

3. In an automatic control for a water softener having valve mechanism for controlling the flow of water and regenerating fluid therethrough, the combination with a revoluble cam operatively connected to said valve mechanism, of a water driven motor for rotating said cam, means for supplying water to said softener through said motor, said motor being adapted to turn said cam in proportion to the quantity of water supplied to the softener, a by-pass for said motor arranged to supply water to said softener and a valve disposed in said by-pass to restrict the flow of water therethrough.

4. In an automatic control for a water softener having valve mechanism for controlling the flow of water and regenerating fluid therethrough, the combination with a revoluble cam operatively connected to said valve mechanism, of a water driven motor adapted to slowly rotate said cam, means for supplying water to said softener through said motor, said motor being adapted to turn said cam in proportion to the quantity of water supplied to the softener, a by-pass for said motor arranged to supply water to said softener, a valve disposed in said by-pass to restrict the flow of water therethrough and means arranged to be actuated by said cam to periodically close said by-pass.

5. In an automatic control for a water softener having valve mechanism for controlling the flow of water and regenerating fluid therethrough, the combination with a revoluble disc, of a member arranged to actuate said valve mechanism adjacent to said disc, an annular guide for said member on said disc, said guide being divided into complementary segments, one of which is formed upon a smaller radius than the other and having openings to permit substantially radial movement of said member and means for slowly rotating said disc at a rate of speed which is proportional to the rate of flow of water to said softener.

6. In an automatic control for a water softener having valve mechanism for controlling the flow of water and regenerating fluid therethrough, the combination with a revoluble disc, of a rod arranged to actuate said mechanism, bearings for said rod disposed to permit longitudinal movement thereof diametrically across said disc, an annular guide for said rod on said disc, said guide being divided into complementary segments, one of which is formed upon a smaller radius than the other and having openings to permit substantially radial movement of said rod and means for slowly rotating said disc at a rate which is proportional to the rate of flow of water to said softener.

7. In an automatic control for a water softener having valve mechanism for controlling the flow of water and regenerating fluid therethrough, the combination with a revoluble disc, of a rod arranged to actuate said mechanism, bearings for said rod disposed to permit longitudinal movement thereof diametrically across said disc, an annular guide for said rod on said disc, said guide being divided into complementary segments, one of which is formed upon a smaller radius than the other and having openings to permit substantially radial movement of said rod, means for slowly rotating said disc at a rate which is proportional to the rate of flow of water to said softener and spring pressed fingers arranged to impart reciprocating movement to said rod under control of said guide.

8. In an automatic control for a water softener having valve mechanism for controlling the flow of water and regenerating fluid therethrough, the combination with a revoluble disc, a rod movable diametrically across said disc adjacent to the face thereof and arranged to actuate said valve mechanism, an arcuate guide for said rod on said disc, a second arcuate guide concentric with said first mentioned guide but of different radius, means on said rod for successively engaging said guides, said guides being formed to permit the passage of said engaging means substantially radially from one to the other, means for reciprocating said rod under the control of said guides and a water driven motor arranged to rotate said disc in proportion to the rate of flow of water to said softener.

In testimony whereof, we have hereunto signed our names to this specification.

ALBERT C. HOUGLAND.
LYNN G. LINDSAY.